Oct. 8, 1929.    C. P. WETMORE    1,730,399
REAMER
Original Filed June 21, 1921
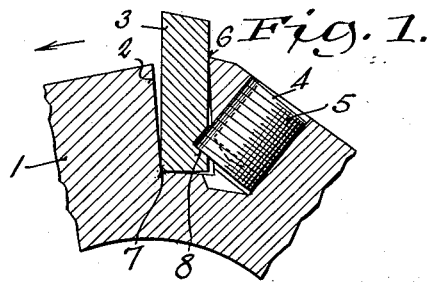
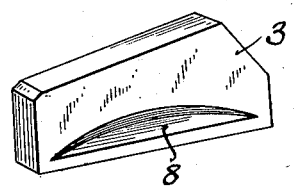
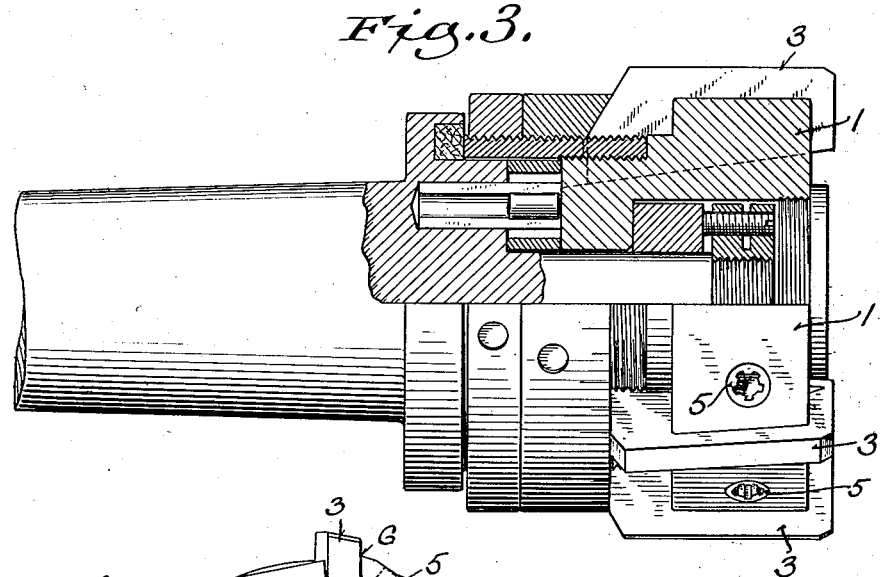
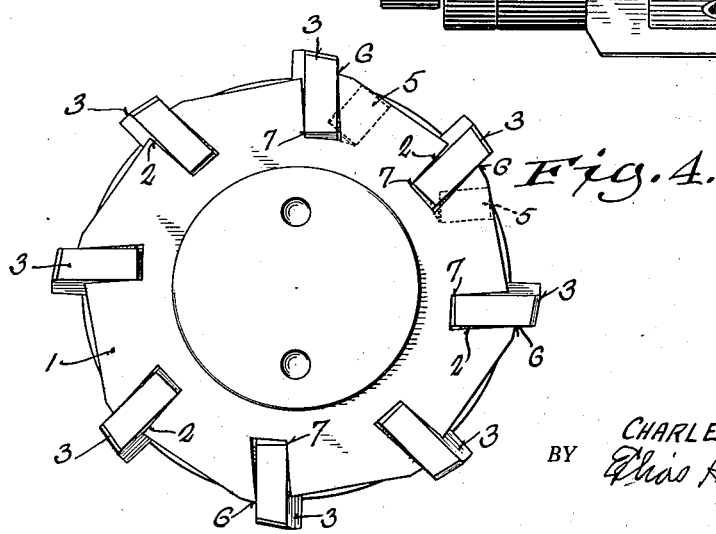
INVENTOR.
CHARLES P. WETMORE
BY
ATTORNEY.

Patented Oct. 8, 1929

1,730,399

UNITED STATES PATENT OFFICE

CHARLES P. WETMORE, OF MILWAUKEE, WISCONSIN, ASSIGNOR TO WETMORE REAMER COMPANY, OF MILWAUKEE, WISCONSIN, A CORPORATION OF WISCONSIN

REAMER

Original application filed June 21, 1921, Serial No. 479,356. Divided and this application filed July 2, 1924. Serial No. 723,695.

This invention relates to reamers.

It relates particularly to reamers having removable blades.

In accordance with the invention, the reamer head is provided with grooves within which the blades are inserted, the blades fitting loosely within the grooves so that they may be tilted backwardly with respect to the direction of rotation of the reamer to cause contact between the blades and grooves at only the top and bottom of the grooves, and means are provided for holding the blades securely in this two-point contact with the grooves.

An object of the invention is to provide a reamer having the blades thereof loosely fitted within grooves in the reamer head and tilted backwardly with respect to the direction of rotation of the reamer, so that there is two-point contact between the grooves and blades.

Another object is to provide an improved means for securing blades to a reamer head by tilting the blades thereof backwardly within grooves in the reamer head and holding the blades in two-point contact with the grooves.

Another object is to provide an improved means for securing blades to a reamer head to eliminate chattering and to insure smooth and accurate cutting.

Other objects and advantages will hereinafter appear.

For the purpose of illustrating the invention, an embodiment thereof is shown in the drawings, in which Figure 1 is a transverse sectional view, showing the manner in which the blades are tilted backwardly within the grooves in the reamer head and held in this position in two-point contact with the grooves;

Fig. 2 is a perspective view of a blade;

Fig. 3 is a side elevation of the reamer, partly in section, showing the manner in which the blades are arranged and assembled with respect to the reamer head; and Fig. 4 is an end view, looking toward the left in Fig. 3.

The invention comprises, in general, a reamer head 1 provided with grooves 2, blades 3 loosely fitted within the grooves and tilted backwardly with respect to the direction of rotation of the reamer head, and means 4 for holding the blades in two-point contact with the grooves.

The means 4 for holding blades 3 in two-point contact with grooves 2 may comprise screws 5. The screws 5 are threaded into the reamer head 1, as shown in Fig. 1, so that the lower ends thereof engage the lower portions of the blades to tilt the same backwardly with respect to the direction of rotation of the reamer head and thereby hold the blades in contact with grooves 2 at two points 6 and 7.

The direction of rotation of the reamer is indicated by the arrow in Fig. 1.

Each blade 3 is provided with a recess 8 within which the lower end of screw 5 fits.

The outer ends of screws 5 are provided with suitable recesses having a characteristic shape, as indicated in Fig. 3, for the reception of a wrench.

The blades 3, of course, actually engage grooves 2 on two lines and not on two points, the words two-point contact being used merely for convenience in describing and claiming the invention.

When the reamer head is rotated in the direction of the arrow, as shown in Fig. 1, each blade 3 will be firmly supported at the back thereof by the upper portion 6 of groove 2.

Each screw 5 holds the blade in engagement with groove 2 at 6 and 7, so that the blade is held against any movement with respect to head 1 to cause chattering.

The bottom of grooves 2 or the bottom of blades 3 may be cut at a slight angle, as indicated in Fig. 1, so that when each blade 3 is tilted backwardly the bottom of the blade will only engage the bottom of the groove at the point 7.

The improved method of holding the blades in two-point contact with the grooves has been shown in connection with an adjustable reamer described and claimed in my co-pending application Serial No. 479,356, filed June 21, 1921, (Patent No. 1,621,227, March 15, 1927,) of which this application is a division.

The invention claimed is:

1. A reamer comprising a head having a groove, a blade loosely fitted in the groove, the bottoms of the groove and of the blade being shaped to provide a fulcrum between the forward edge of the bottom of the blade and the forward portion of the bottom of the groove and to provide a clearance between the rearward portion of the bottom of the blade and the rearward portion of the bottom of the groove, said blade being tilted backwardly in the groove about said fulcrum until its back face has line contact with the outer edge of the back wall of the groove, the forward edge of the bottom of the blade engaging the front wall of the groove, and means for tilting the blade rearwardly and holding it engaged with its fulcrum and with the front and back faces of the groove.

2. A reamer comprising a head having a groove, a blade loosely fitted in the groove, the bottoms of the groove and of the blade being shaped to provide a fulcrum between the forward edge of the bottom of the blade and the forward portion of the bottom of the groove and to provide a clearance between the rearward portion of the bottom of the blade and the rearward portion of the bottom of the groove, said blade being tilted backwardly in the groove about said fulcrum until its back face has line contact with the outer edge of the back wall of the groove, the forward edge of the bottom of the blade engaging the front wall of the groove, and a screw threaded through the head at an angle, said blade having its back face provided with a notch with which the screw engages.

3. A reamer comprising a head provided with a groove, a blade fitted loosely in the groove and fulcrumed on the bottom wall thereof, said blade being tiltable backwardly about its fulcrum until the upper portion of its back face engages the upper part of the back wall of the groove, the lower portion of the front of the blade engaging the lower part of the front wall of the groove, said blade being otherwise free from contact with the walls of the groove, and means for tilting the blade backwardly about and holding it firmly engaged with its fulcrum and also firmly against the parts of the front and back walls of the groove with which it is engaged.

4. A reamer comprising a head provided with a groove, a blade loosely fitted within the groove and fulcrumed near the bottom of the groove and tiltable backwardly about its fulcrum to a rearwardly inclined position in which the lower portion of its front face and the upper portion of its rear face have line contact only with the respectively opposed walls of the groove, and means for clamping the blade in such rearwardly inclined position in engagement with the fulcrum and with the groove walls, the front and rear faces of the blade having substantially line contact only with portions of the opposed walls of the groove with which they are engaged.

5. A reamer comprising a head having a groove, a blade fitted loosely in the groove, the bottom of the groove and the bottom of the blade diverging in a direction opposite to the direction of rotation of the head whereby the forward lower corner of the blade is engaged with and fulcrumed on the bottom of the groove at the forward lower corner thereof and the lower front portion of the blade is engaged with the lower part of the front wall of the groove while the upper portion of the back of the blade is engaged with the upper part of the rear wall of the groove, said blade being otherwise free from contact with the walls of the groove, and clamping means coacting with the blade for firmly holding it in position in the groove and in engagement with its fulcrum and with the front and rear walls of the groove as aforesaid.

6. A reamer comprising a head provided with a groove, a blade fitted loosely in the groove, and fulcrumed near its lower front edge on the bottom wall of the groove, the front and bottom walls of the groove defining a greater angle than the front and bottom faces of the blade, whereby said blade may be rocked on its fulcrum, and means to tilt the blade rearwardly into contact with the upper portion of the rear wall of the groove, and to maintain the blade on its fulcrum.

7. A reamer comprising a head provided with a groove, a blade fitted loosely in the groove, and fulcrumed near its lower front edge on the bottom wall of the groove, the front and bottom walls of the groove defining a greater angle than the front and bottom faces of the blade, whereby said blade may be rocked on its fulcrum, and means to tilt the blade rearwardly into contact with the upper portion of the rear wall of the groove, and to maintain the blade on its fulcrum, the upper portion of the front face of the blade and the lower portion of the rear face thereof being out of contact with the respectively opposed portions of the groove walls.

8. A reamer comprising a head having a groove therein, a blade positioned in the groove, the blade having a smaller transverse dimension than the groove throughout the depth of the latter, the blade and groove being so formed as to provide a fulcrum about which the blade is tiltable backwardly with respect to the direction of rotation of the head and also to provide an abutment with which the lower edge of the blade is engaged to limit positively the forward movement of the lower edge of the blade, and means to tilt the blade rearwardly into substantially line contact with the upper portion of the rear wall of the groove and to maintain the blade on its fulcrum, at least the upper portion of the front face of the blade and the lower portion of the rear face thereof being out of contact with the respectively opposed portions of the groove walls.

In witness whereof I hereto affix my signature.

CHARLES P. WETMORE.